(No Model.) 8 Sheets—Sheet 4.
F. RITTER.
DENTAL CHAIR.
No. 605,974. Patented June 21, 1898.
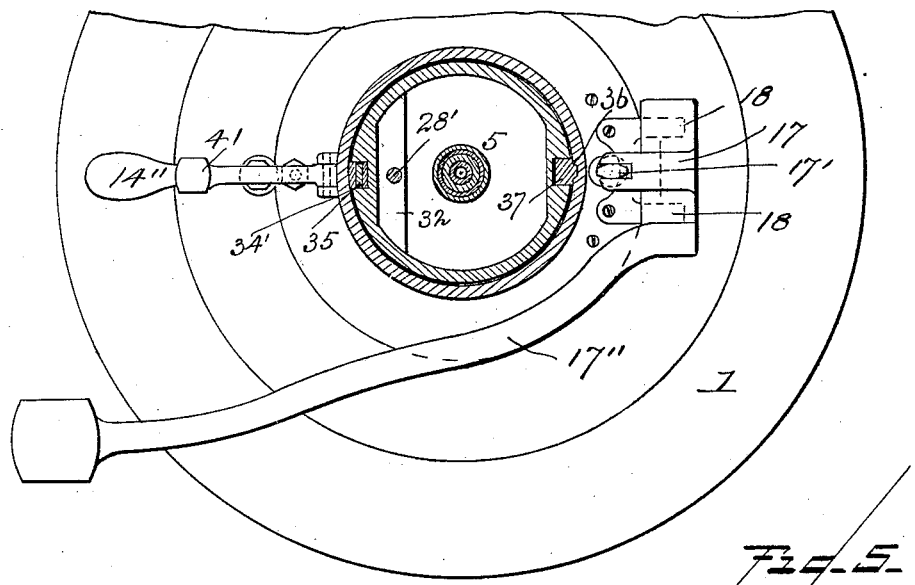
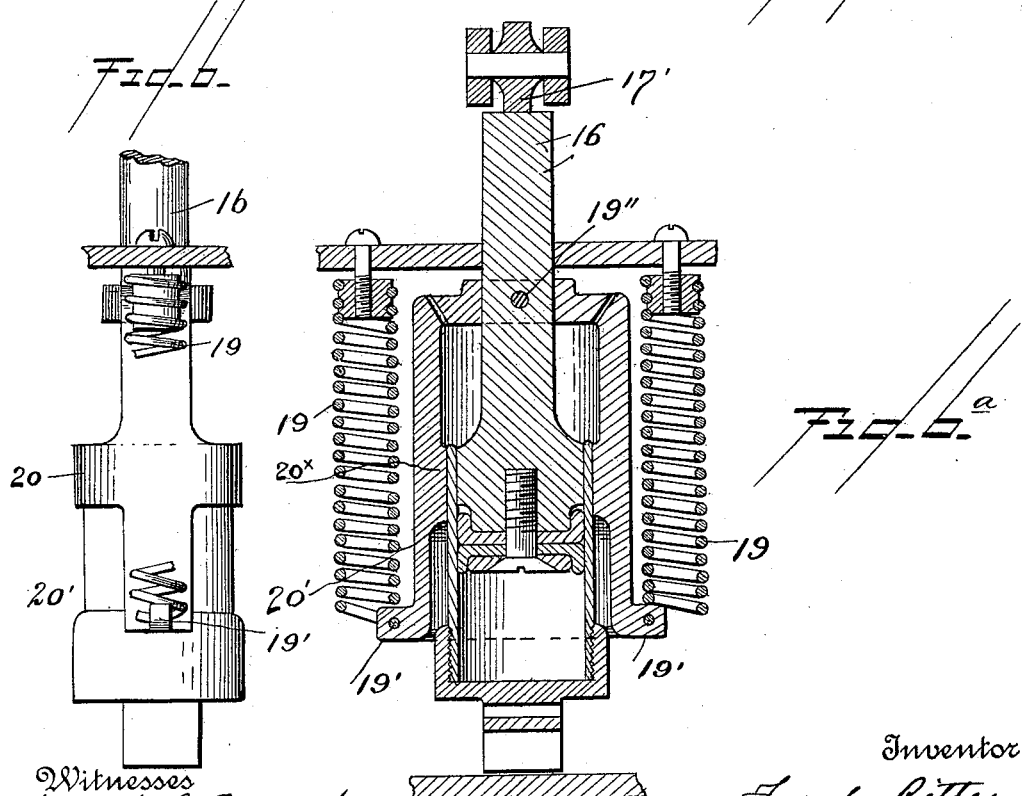
Witnesses
Franck L. Ourand,
C. M. Catlin.
Inventor
Frank Ritter
by Benj. R. Catlin
Attorney

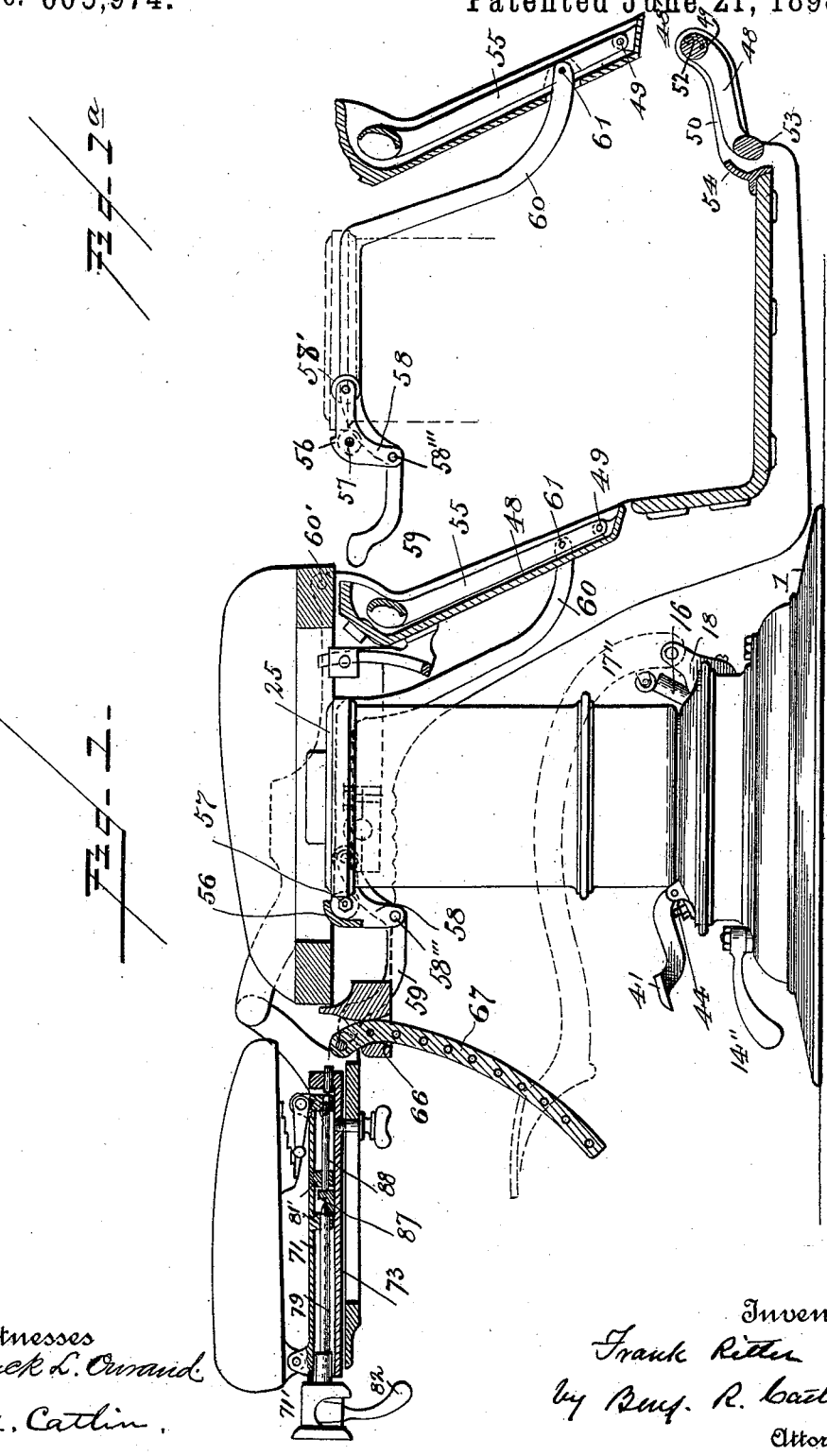

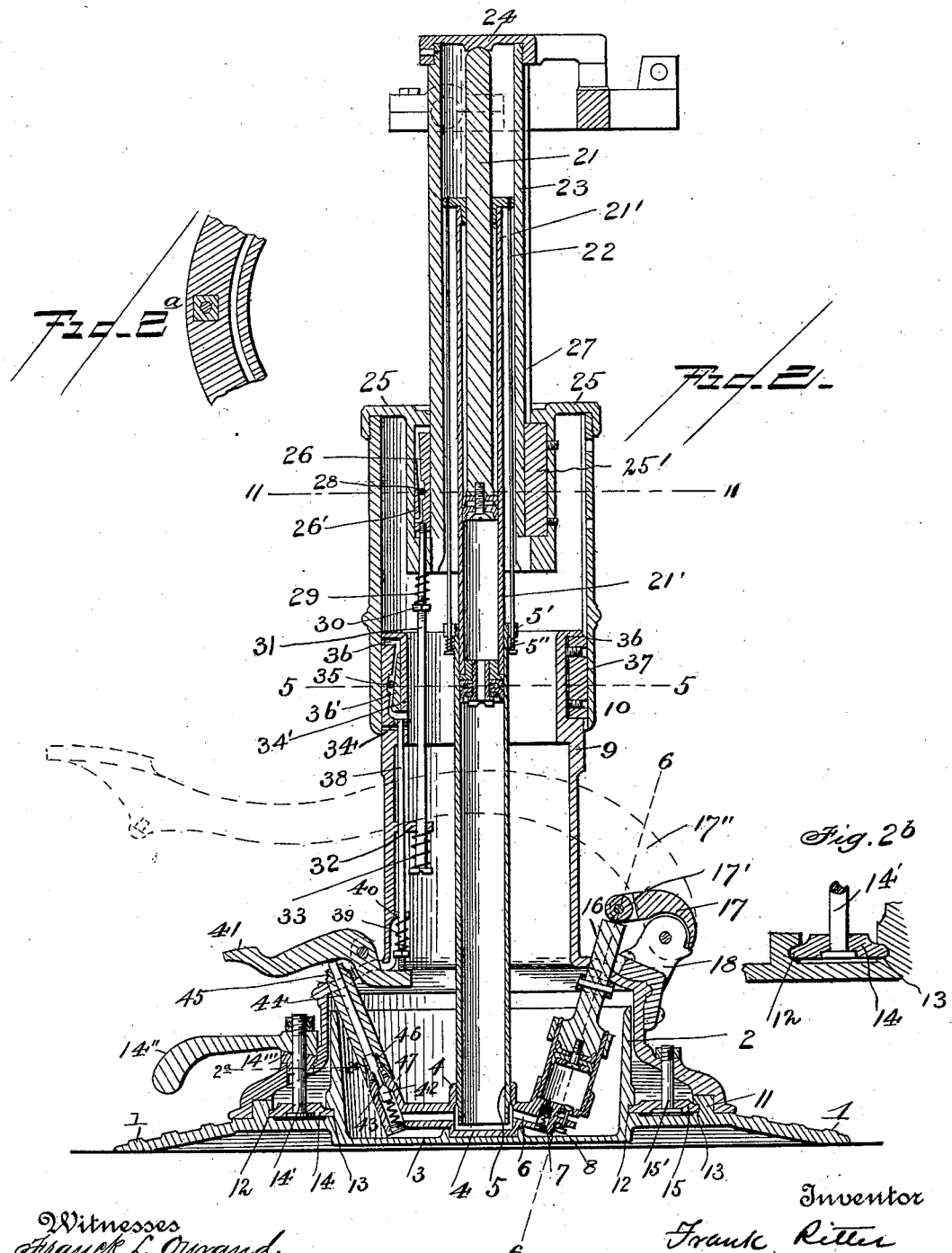

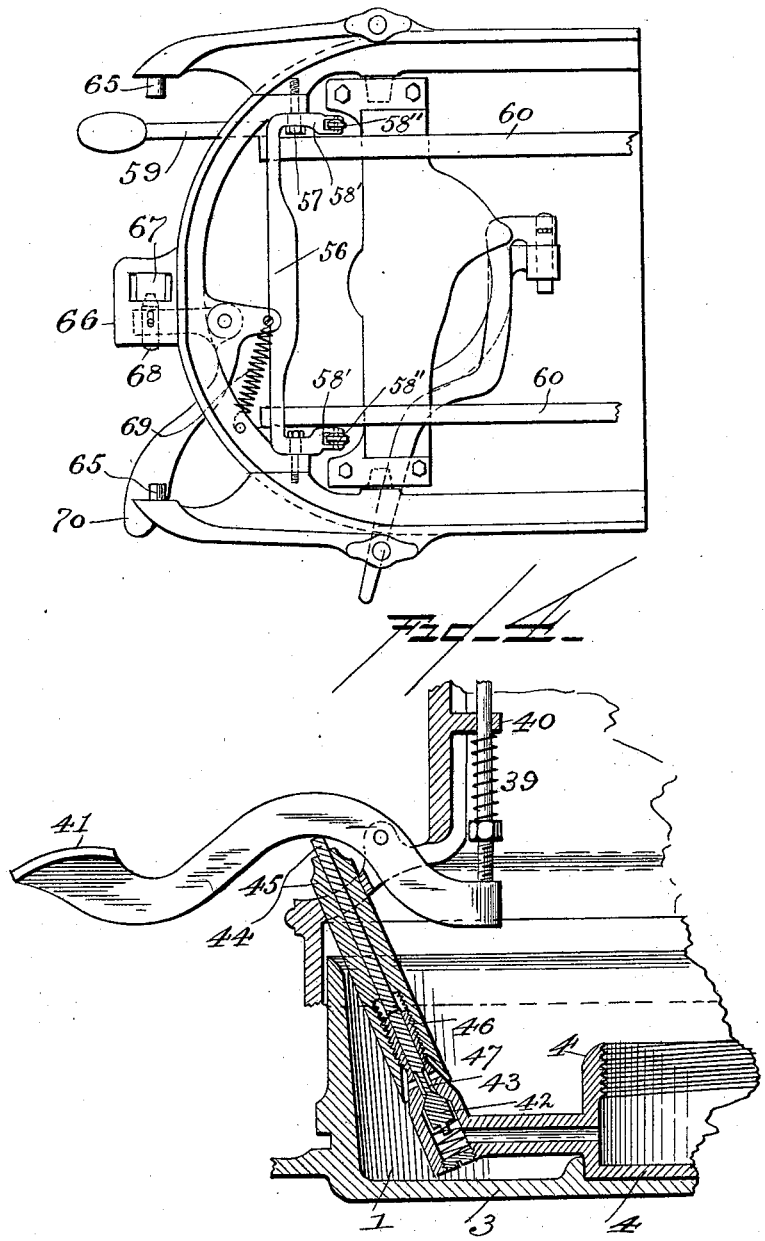

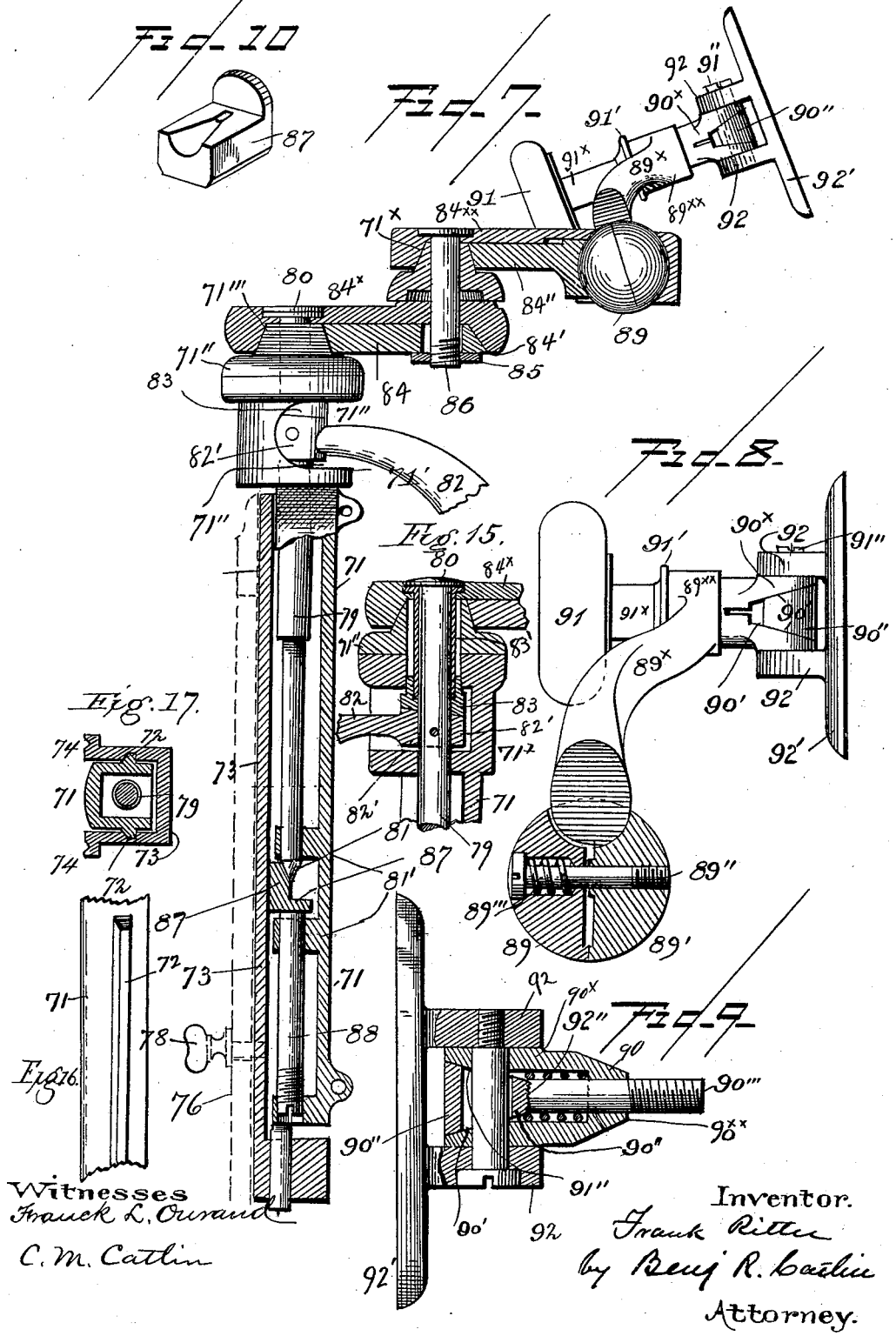

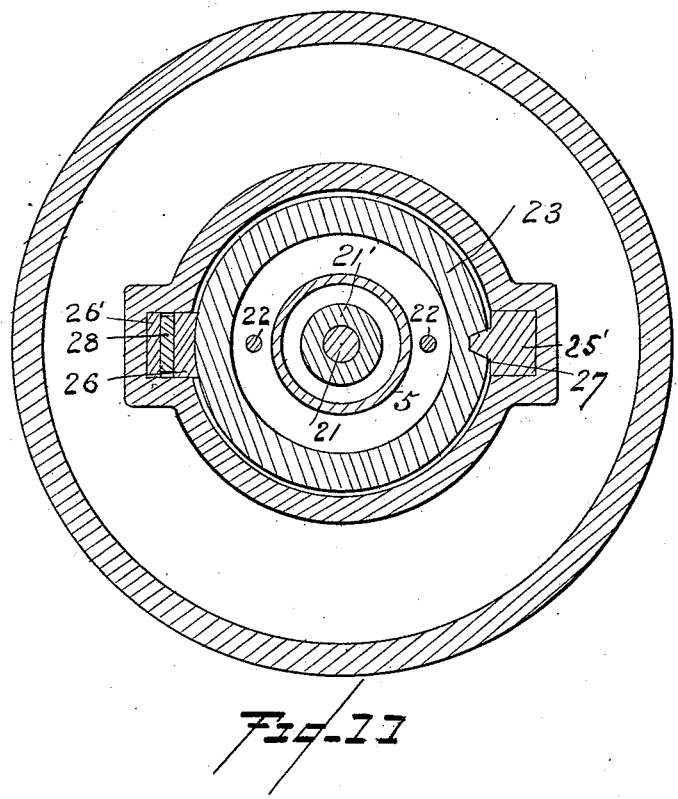

(No Model.) 8 Sheets—Sheet 7.
F. RITTER.
DENTAL CHAIR.
No. 605,974. Patented June 21, 1898.
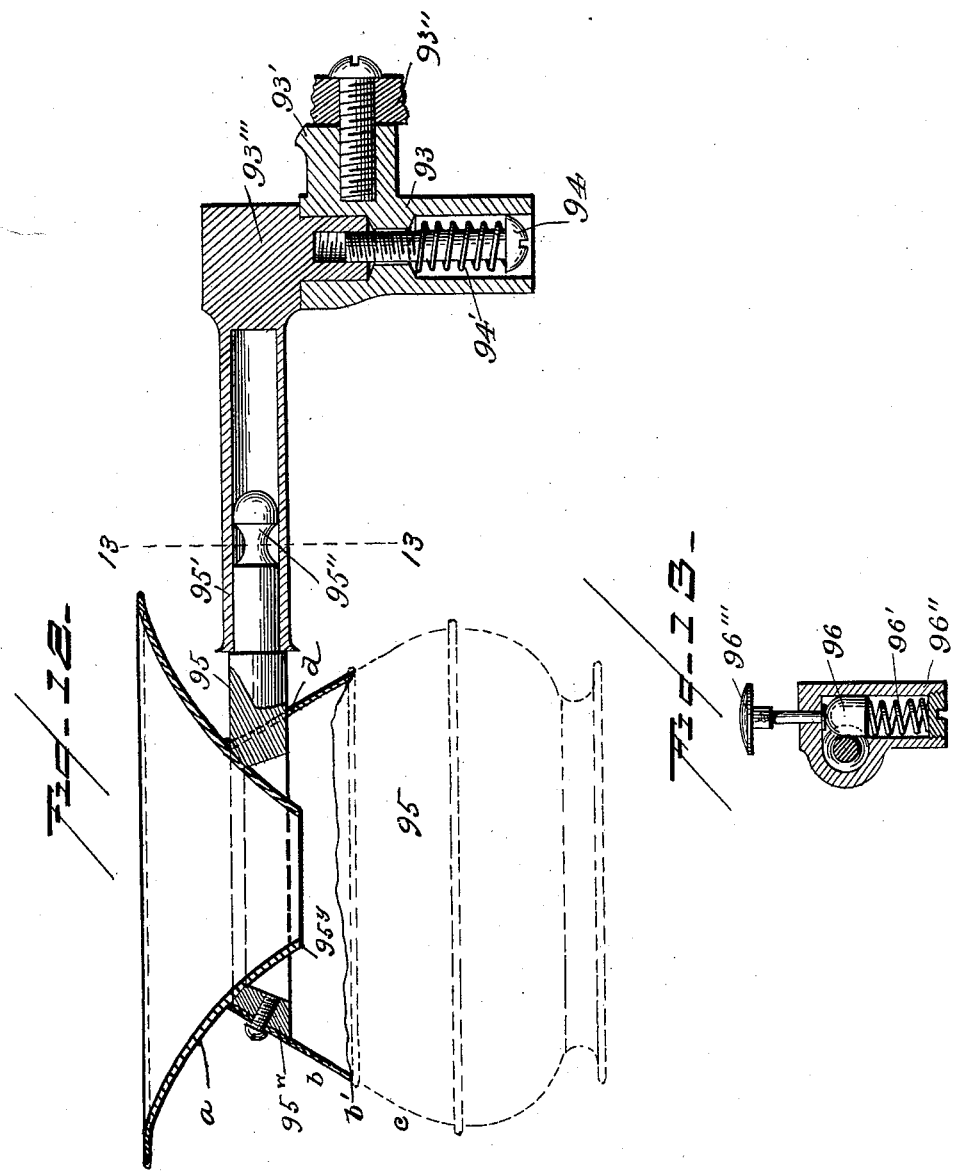
Witnesses
Franck L. Ourand.
C. M. Catlin.
Inventor
Frank Ritter
by Benj. R. Catlin
Attorney

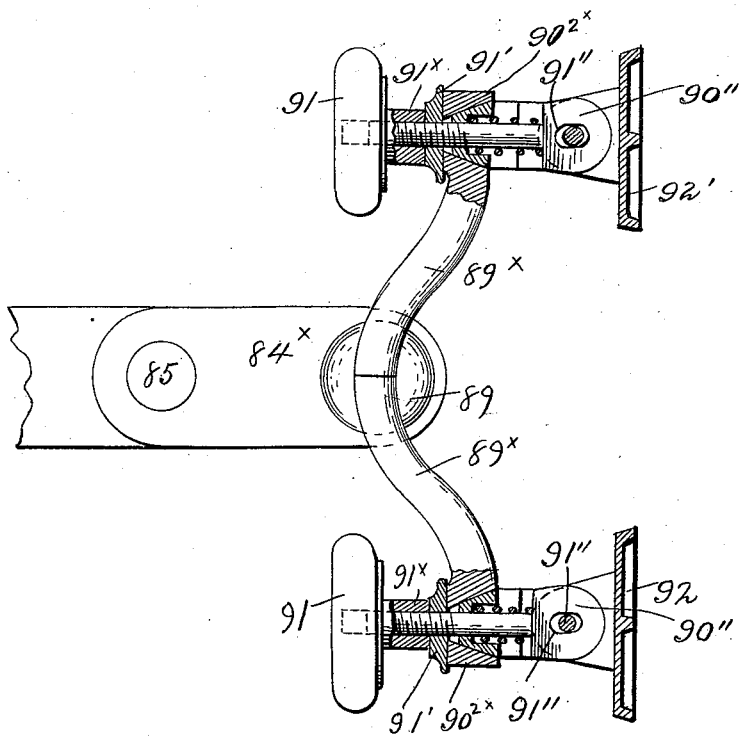

UNITED STATES PATENT OFFICE.

FRANK RITTER, OF ROCHESTER, NEW YORK.

DENTAL CHAIR.

SPECIFICATION forming part of Letters Patent No. 605,974, dated June 21, 1898.

Application filed January 18, 1897. Serial No. 619,608. (No model.)

*To all whom it may concern:*

Be it known that I, FRANK RITTER, a resident of Rochester, in the county of Monroe and State of New York, have invented certain new and useful Improvements in Dental Chairs; and I do hereby declare the following to be a full, clear, and exact description of the invention, such as will enable others skilled in the art to which it pertains to make and use the same.

The invention relates to dental chairs, and has for its object to increase certainty, ease, and efficiency in the operations of various parts and to lessen their cost so far as consistent with the other advantages aimed at; and the invention consists in the construction hereinafter described and particularly pointed out.

In the accompanying drawings, Figure 1 is a side elevation, partly in section, of the improved chair, the arm-rests being omitted and the back adjusted to a horizontal position. Fig. 1$^a$ is a similar view of a supplemental or child's foot-rest. Fig. 2 is a vertical central section of the seat supporting and elevating parts, the seat-elevating parts being shown as partially raised. Fig. 2$^a$ is a partial horizontal section on line 2$^a$ of Fig. 2. Fig. 2$^b$ is a section of a modified detail. Fig. 3 is a plan of the chair-seat frame. Fig. 4 is an enlarged partial section of the base and inclosed valve. Fig. 5 is a section on line 5 5 of Fig. 2. Fig. 6 is an enlarged partial side elevation of a pump. Fig. 6$^a$ is a yet further enlarged section of a modification of the piston-rod guide and spring-support. Fig. 7 is a side elevation, partly in section, of the head-rest and its support. Fig. 8 is a similar view, enlarged, of the head-rest, the ball portion of its ball-and-socket joint being shown in section. Fig. 9 is a side elevation, partly in section, on an enlarged scale, of a head-rest pad and its immediate connections. Fig. 10 is an enlarged isometric view of a wedging-block. Fig. 11 is a section on line 11 11 of Fig. 2. Fig. 12 is a partial longitudinal section of a spittoon-support. Fig. 13 is a section on line 13 13 of Fig. 12. Fig. 14 is a horizontal section of the head-supporting pads and connections. Fig. 15 is a partial vertical section. Fig. 16 is a partial side elevation of a head-rest-supporting bar, and Fig. 17 is a transverse section of said bar and of longitudinally-adjacent parts.

Numeral 1 (see Fig. 2) denotes a base integrally formed with a liquid-reservoir 2, and having a floor 3 common to both. In said floor is provided a suitable seat for securing a coupling 4, adapted to receive the screw-threaded foot of a fixed plunger tube or cylinder 5. An inlet to said cylinder from a pump is denoted by 6. The pump inlet and outlet valves are denoted by 7 and 8, respectively.

The chair-pedestal is made in two sections, (denoted by 9 and 10.) The lower section 9 rests rotatably on a suitable annular bearing-flange 11, formed on the base. On the inside of flange 11 and on the outside of the reservoir are grooves 12 and 13, adapted to receive the edges of rotatable disks or wheels 14 and 15. The axis 14' of disk 14 extends outside the pedestal and has secured upon it a cam-lever 14'' with a face corresponding to a cam-face 14''', supported in the pedestal, the construction being adapted to tighten or loosen the connected parts with the effect to lock the pedestal to the base or to relieve the said locking, as required. The axis 15' of the disk 15 is secured in the pedestal, as indicated. These disks or wheels act as pedestal-centering and antifriction devices, and they also obviate tipping of the pedestal in the base, and the disk 14 constitutes also an operative element of the locking mechanism. These disks may be more or less rounded on their peripheries, as indicated in Fig. 2$^b$.

The foot of the pump is supported on the casting or coupling 4. The pump piston-rod 16 extends through the wall of the pedestal and its upper end is adapted to be pressed by a lever-arm 17, provided with an antifriction-roller 17', bearing on the top of the piston. The long arm of the lever is denoted by 17'' and its fulcrum is supported in the lugs 18 of a bracket secured to the pedestal, the short arm 17 being situated between said lugs and the long arm outside thereof.

19 (see Fig. 6) denotes returning-springs attached to the pedestal and to lugs 19', mediately fixed to the piston-rod at 19'' by the ring 20 or the cylinder or cup 20$^\times$, (see Fig. 6$^a$,) which has a bearing on the exterior of the pump-cylinder at 20' and serves to guide and steady the rod, and this effect may be further aided by the bearing of the rod in the pedestal-wall. The situation of the pump-cylinder entirely within the closed pedestal, the pump-lever being on the outside and the piston-rod fitting and movable through an opening in the pedestal-wall, provides for the exclusion of dust or other matter from the reservoir.

The pump is adapted to force liquid through passage 6 into the fixed tube or cylinder 5 and force up the seat-supporting plunger 21 and the intermediate plunger-tube 21'. Rods 22 are fixed to the upper end of the movable plunger-tube. Their lower ends pass through a flange 5' at the top of cylinder 5, and below said flange they are provided with heads that act as stops to limit the ascent of the rods and of tube 21. Springs to obviate jar are denoted by 5''.

The pedestal-section 10 is movable vertically with respect to the lower section by means of a cylinder or tube 23, fixed to the cross-bar 24 of the chair-seat frame. This cylinder is connected to the pedestal by means of a cap 25, which has a pendent cup carrying a key 25' and a locking device comprising two parts or blocks 26 and 26', having proximate inclined planes.

A keyway is denoted by 27. The key prevents independent rotary motion of the seat-frame and upper pedestal-section, but permits independent vertical movements.

The block or part 26 is recessed to receive a roller 28.

To block 26 is attached a rod 31, and 29 is a spring normally holding block 26 down.

30 is a spring retaining and adjusting nut movable on the rod 31. The pedestal-section 10 and cylinder 23 are locked together normally, the lock being released when by the descent of section 10 the nut 30 comes in contact with a web or bracket 32, through which the rod moves. In the reverse or upward movement a spring 33 engages the under side of web 32 and obviates jarring, at the same time depressing block 26 to lock the upper pedestal-section and cylinder 23, as shown in Fig. 2.

The pedestal-sections are locked together and may be unlocked by a similar device comprising parts or blocks 34 and 34' and roller 35, these several parts being situated in an annular recess 36, formed in the top of pedestal-section 9, said recess also containing a key 37. To block 34 is attached a rod 38, normally depressed by a spring 39, and said rod has bearings in and moves through webs or brackets 32 and 40. The rod 38 is lifted to move up block 34 and unlock the pedestal-sections by a lever 41, having a fulcrum to the pedestal and extending through its wall. The depression of the external arm of the lever which releases the lock also opens a valve 42, which permits liquid to escape from below the plunger back into the reservoir, so that the plunger and chair-seat may descend.

43 denotes escape-ports above the valve-seat.

44 is the valve-stem, having its upper end in the path of the lever.

45 is a tube secured in the pedestal-wall and screwed upon an extension 46 of the valve-seat tube. Said tube has a frusto-conical part 47, in which are situated the ports 43. The tube 45 has its foot provided with a similarly-shaped recess adapted to surround said frusto-conical part 47, whereby the discharge from ports 43 can be regulated by screwing the tube 45 up or down on the valve-seat-tube extension 46.

48 indicates a foot-rest pivotally supported on pins 49, fixed to the side arms 50 of the frame and adapted to travel in the groove 52, formed in the end of the roll 48' of the foot-rest. These devices are applied to both ends of the roll. The pins stop the foot-rest when swung in either direction. The foot-rest roll 53 in its inner position is inoperative and below the foot-support 54 of the platform, as shown in Fig. 1.

55 denotes a child's foot-rest pivoted to an extension of the chair-seat frame at 49.

56 (see Figs. 1 and 3) is an oscillating bar pivoted to the seat-frame at 57 on each side. This bar has forward projections 58' and also downward projections 58. At 58''' in the lower ends of these downward projections are pivoted the arms or rods 60, which arms are also connected to the child's foot-rest at 61. The lever 59 extends back and outside the bottom of the seat-frame, at one side thereof. It is a part of the casting or bar 56 and arm 58. When the lever or bar 59 is pushed forward to rock the bar 56 about its pivot 57, the arms 58' and rollers 58'' elevate the rear of the seat. At the same time the downward projections with pivots 58''' swing forward with arm 60 and push the child's foot-rest forward about pivots 49. The seat is pivoted at 60' on each side. When the said rest has been moved into position for use, the rear of the seat being simultaneously raised, the arms 58' will stand in a vertical or approximately vertical plane, so that the weight of the occupant of the chair, pressing the seat-frame upon the rollers in said arms, will have no effect to return the foot-rest, but will have the opposite effect, if any, as will be the case if the seat-frame before being tilted up is horizontal and the bearings of the wheels 58'' when raised are directly above the pivots 57 or near that situation.

The chair-back frame is pivoted in usual manner, and the pivots are indicated by 65. (See Fig. 3.) At the rear of the seat-frame is a tubular socket 66 for the passage of the curved bar 67, connected to the back-frame and provided with holes to receive a pin 68 under the influence of a spring 69, said pin being normally supported in the side of the socket 66. The pin can be withdrawn from the bar 67 by a bent lever having a handle 70, said lever also constituting the medium by which the spring moves the pin into engagement with the adjusting-bar. These devices act with less jar and noise than a rack and pawl.

The head-rest is supported mediately from the back-frame in usual manner.

71 denotes a movable bar, U-shaped in cross-section, having a tubular head 71', with a side opening 71'', and provided with ribs 72 to engage grooves in the interior of a similarly-shaped movable bar 73, partially inclosing said bar 71, to which latter the upholstered back is pivoted. The bar 73 has ribs 74, adapted to fit and move in grooves formed in the back-frame 76, said frame being indicated by dotted lines in Fig. 7, but not shown in the section, and 78 is a handled screw by which the back-frame and bar 73 can be rigidly secured together and which when loose can be used to move bar 73 up and down in the back-frame.

79 is a rod having a head 80, a point 81, and a handle 82, fixed to a ring-cam 82', said cam being fixed by a pin or otherwise to the rod 79. 83 is a corresponding cam-ring held against rotation on rod 79 by the connection of said ring with the head 71'. Said rod 79 is movable lengthwise through the cam 83 by means of the cam 82', operated by the handle.

83' is a sleeve having a flange or rim 83'' at its upper end. Its bottom part on its exterior is made angular and adapted to fit an angular recess in the cam 83. The foot of the sleeve and the recess are of approximately frusto-pyramidal or like form, so that the cam is stopped by the sleeve when the latter is forced down by the medium of the rod 79, controlled by the handle and its double cam 82'. The part 82' when the handle is suitably manipulated acts as a wedge to crowd the contiguous and connected oppositely-movable parts to a solid bearing, the parts 71 and 79 being oppositely moved with the effect to crowd the lower point of 79 into the recess in block 87 and also to tighten the parts 80, 84$^x$, and 71'''' and fasten these several parts in close contact.

71'' denotes a tubular device having a hollow wedge or extension provided with inclined surfaces 71''', fitted to similar surfaces, one on the end of a movable block 84 and the other within a covering plate or block 84$^x$. When handle 82 and its cam 82' are turned against the cam 83, the rod 79 is forced down and by its head 80 draws down the cover 84$^x$ upon the wedge having faces 71''' with the effect to crowd the wedge-block 84 against an incline 84' at the other end of the cover. The action of these inclines when thus crowded together tends by the medium of a bolt 86 and nut 85 to pull a covering plate or block 84$^{xx}$ upon a wedge having inclines 71$^x$ and crowds a wedge-block 84'' against the ball of the ball-and-socket joint, with a head-rest-supporting arm 89$^x$.

A very small movement of the several parts above described is sufficient to wedge them together, and to provide for regulating the extent of the movement and compensate for wear a nut 85 is combined with the bolt 86. By suitably turning the nut on the bolt the normal situation of the various wedging-surfaces can be regulated.

In a recess formed by webs 81' in the bar 71 is situated a wedging-block 87, having a semiconical seat for the point of the rod 79. When said rod is rotated to operate the cams and wedges to bind the ball of the aforesaid ball-and-socket joint, the reciprocal movement between bar 71 and rod 79, caused by the cams, forces the point of the latter into its seat in the block 87 and crowds it laterally in manner to bind the bars 71 and 73 together, the rod being also crowded against the wall of the web-opening, through which it extends, all the parts being thus held against lengthwise movement.

88 denotes a regulating-pin whereby the situation of the wedging-block can be varied.

The ball of the ball-and-socket joint is composed of hemispherical parts 89 and 89', held together by a screw-pin 89''. A concealed spring to hold the hemispheres together and increase their friction is denoted by 89'''. Each half-ball 89 and 89' has a pad-supporting arm 89$^x$, which at its outer end fits and embraces a conical part 90 of a bifurcated pad-holder or split block 90$^x$, having inclined faces 90' to embrace a transversely-perforated wedge 90'', provided with a screw-stem 90''', upon which is screwed a handle 91, having a handle extension 91$^x$. A loose washer 91' is interposed between said handle extension and the hub or shoulder 89$^{2x}$ of the pad-supporting arm, which hub embraces frusto-conical part 90$^{2x}$ of the split block or pad-holder 90$^x$. 91'' is a screw-threaded pin passing through the arms of said split block and through the wedge 90'' and through projections or lugs 92, fixed to the pad-plate 92'. One of the functions of this pin is to prevent the spreading of the lugs.

The exterior and operative connection of the parts just above described is shown in Figs. 7 and 8 and a section of the same in Fig. 9, the washer 91', the handle, and the arm 89$^x$ being omitted. In assembling the parts the hub of said arm is placed upon part 90$^{2x}$. (See Fig. 9.) The thin washer is next placed on the stem 90''', its function being to prevent the turning action of the handle extension from affecting the arm 89$^x$ when the handle is screwed home upon the threaded stem 90'''. The effect of screwing the handle-hub against the washer and forcing that against the arm-hub is to pull the wedge 90'' between the inclined faces 90' of the split block 90$^x$ and crowd the parts of the block against the lugs 92, with the effect to bind them immovably together. When the handle is unscrewed, the wedge is returned or loosened by a returning-spring 92''.

By the above-described construction either of the pads, with its lugs, is fastened by the spreading of the parts of the split block against said lugs, which spreading is effected by the handle 91 and screw-stem 90'''. The same manipulation also locks the tapered or conical part 90 in an arm 89$^x$ of a hemisphere, and the two fastening or locking effects are simultaneously secured. The pads can each be turned about a line passing centrally through its supporting devices and handles and also about the pivot 91''. Both adjustments are desirable, the former providing among other things for supporting a lady's head without disturbing the dressing of her hair.

93 (see Fig. 12) denotes a detachable block having a stem 93' provided with a screw, whereby it may be connected to an intermediate part 93'', fixed to a chair. Said block has a socket to receive the plug 93''' of a spittoon-holder. Said holder is rotatably held in the block by means of the concealed screw 94, having a spring 94', bearing on the perforated diaphragm separating the socket and recess to hold the stem in the socket and cause a friction in the joint between the bottom face of 93''' and top surface of the block 93 to hold the spittoon from swinging too freely about its pivot.

The spittoon is directly supported on a ring 95$^w$, having a stem 95 projecting through its wall beneath the skirt 95$^y$ of the spittoon mouth and hopper and adapted to enter a tubular part 95' of the holder.

95$^x$ indicates a ring-securing screw.

The spittoon may be made of three sections. (Shown assembled by dotted lines in Fig. 12, and indicated by $a$, $b$, and $c$.) Before $b$ and $c$ are joined on the line $b'$ the ring can be suitably placed within section $b$ and its stem passed through a suitable opening at $d$. The fastening-screw 95$^x$ can then be screwed into the ring through a hole in the part $b$. When the parts are all secured together, the stem 95 can be used as a handle, and it also provides a means of connection with a bracket-arm. The ring is concealed by the improvement, thereby improving the appearance of the device, and what is more important it is more firmly held, being secured, as specified, to the spittoon-wall. Its situation and bearing between the hopper-skirt and spittoon-wall are also added elements of strength.

95'' indicates a groove in the ring-stem, and 96 a movable plug adapted to be held in engagement therewith by a spring 96'. To remove the ring and spittoon for emptying the latter, the spring is compressed and the block forced into a pocket 96'' by a sliding thumb-piece 96'''. In the situation illustrated the parts are securely locked together.

Details of the above-described improvements may be varied so long as the new principles of construction and operation are preserved. For example, the guiding ring or tube that surrounds and fits the pump-cylinder may be connected to the rod by arms or in any convenient manner. The particular arrangement of the packing-rings of the conduit-plates is not essential, as the ribs may be situated in either plate and the grooves in the other. The upper rotating plate may be connected to the pedestal by any suitable devices.

It is not essential to the operation of the devices for locking the back extensions that the extension-bars shall be identical in arrangement and number with those illustrated.

Having described my invention, what I claim is—

1. In combination the rotatable pedestal, opposite ways situated in a vertical flange of the base and an oil-reservoir wall respectively, and rotating friction-wheels movable around the base in said ways, said wheels having their axes extended upwardly and attached to and movable with the pedestal, substantially as described.

2. In combination the rotatable pedestal, the base provided with ways, friction-wheels movable in said ways and having their axes attached to and movable with the pedestal, and devices for locking a wheel to the base to prevent its rotation, said devices being also adapted to hold the pedestal stationary in the base, substantially as described.

3. The combination of the rotating pedestal, the base provided with oppositely-situated ways, a plurality of antifriction-wheels movable in said ways, wheel-axes having bearings in the pedestal, a cam secured to an axis, and a bearing for the cam on the pedestal, whereby the antifriction-wheels prevent the pedestal from tipping and whereby one of the wheels can be forced against the walls of its ways to prevent its rotation and also lock the pedestal and base together, substantially as described.

4. In combination, the pedestal, the pump-cylinder, the piston-rod fitting an opening in the pedestal, a ring sliding on the exterior of the cylinder, the operating-lever pivoted to the rod outside the pedestal, a rigid connection between the rod and ring, and a like connection of the rod and piston whereby the rod is moved through the pedestal-wall in a straight line, substantially as described.

5. In combination the pump-cylinder, the piston-rod, a flanged ring sliding on the exterior of the cylinder and a rigid connection between the rod and ring, and returning-springs connecting the ring-flange and pedestal-wall on opposite sides of the cylinder, substantially as described.

6. The combination of a chair-base, a rotatable pedestal having telescoping sections, a bearing on the base for one of said sections, separate telescopic plunger-tubes comprising a cylinder connected to the seat-frame, a device to lock together the telescoping pedestal-sections, and a device to lock the upper pedestal-section to the said cylinder, said locking devices being operative at any desired elevation of the upper pedestal-section and cylinder respectively, substantially as described.

7. The combination of a chair-base, a rotary pedestal made in telescoping sections, a cylinder fixed to the seat-frame, and a device to lock the upper pedestal-section to the cylinder at any desired elevation of either the section or cylinder, said locking device comprising a movable part, a rod fixed to said part, a spring to maintain the locking, and devices to overcome the spring and release the lock upon the descent of the said upper section, substantially as described.

8. The combination of a pedestal made in separately-movable sections, a cylinder fixed to the seat-frame, and a device to lock the upper pedestal-section to the cylinder at any elevation of the said section, a spring to maintain the locking, and devices for automatically releasing the lock upon the descent of said section whereby the cylinder and the seat-frame may descend independently, substantially as described.

9. The combination of the fixed plunger-tube, the plunger-tube extension, the plunger, the seat-frame, means for moving the plunger, rods fixed to the movable extension and passing through openings in the fixed plunger-tube, and stops on the lower ends of said rods, substantially as described.

10. In combination with a chair-seat frame, a seat pivoted to said frame, a pivoted foot-rest adapted to be turned into an inoperative position, a bar pivotally connected to said rest and mediately to an oscillating bar pivotally connected to the seat-frame, said bar having arms extended under and approximately parallel with the seat-frame, and a push-bar having a connection below the pivot of the oscillating bar, said arms being adapted to raise the seat when the push-bar and oscillating bar are moved to turn the foot-rest into an operative position, substantially as described.

11. In combination with the chair-seat frame, the seat pivoted at its front to the said seat-frame, a pivoted foot-rest adapted to be turned into an inoperative position, a bar pivotally connected to said rest and mediately to an oscillating bar pivotally connected to the seat-frame, said bar having arms extended under the seat, and a push-bar having a connection below a pivot of the oscillating bar, said arms being adapted to raise the seat when the push-bar and oscillating bar are moved to turn the foot-rest into an inoperative position, and also arranged and adapted to receive the pressure due to the weight of the seat and its occupant on their front sides to prevent the return of the parts, substantially as described.

12. The combination in a chair-back having two connected independently-movable extension parts, of a rod supported to turn in one of said parts and provided with a conical point, a block situated between said parts, transverse webs connected to the exterior part to loosely hold the block, said block having a seat for the point of the rod, and means for rotating the rod and moving it endwise relatively to said exterior part to crowd the block laterally, substantially as described.

13. In a ball-and-socket joint of a head-rest, two hemispheres each provided with a pad-supporting arm, a pin fixed in one hemisphere and movably held in the other to connect the hemispheres, and a spring to force said hemispheres together and increase their friction, substantially as described.

14. In combination with the pad-holding plate having lugs, the split block, the wedge situated between the arms of the split block and provided with a stem, the lugs, block and wedge having a common pivot and the wedge and pivot-receiving opening made larger than the diameter of the pivot to permit the wedge to be moved transversely thereof, and a handle adapted to draw the wedge between the arms and thereby lock the parts together, substantially as described.

15. In combination with the pad-holding plate having lugs, the split block, the wedge situated between the arms of the split block and provided with a stem, said parts having a common pivot, and a handle adapted to draw the wedge between the arms and thereby lock the parts together, and a pad-supporting arm embracing the split block, said arm and block being adapted to be locked together by the said operation of the handle, substantially as described.

16. In combination the block having a socket in its top and a recess in its bottom separated from the socket by a perforated diaphragm, means for securing it to a chair, the swinging bracket-arm having a stud to fit the block-socket said stud having a screw-threaded opening, a screw for the said opening situated in the recess having a diameter less than that of the perforation in the diaphragm to pass freely therethrough, and a spring surrounding the screw below said diaphragm and bearing against the same to pull the screw and hold the stud in its socket in a yielding manner, substantially as described.

17. The hollow bracket-arm in combination with the spittoon-supporting ring provided with a grooved stem to enter said arm, a transverse stop normally situated in the groove, a push-pin to move the stop transversely to the stem, and a returning-spring, the spring being adapted to be compressed and the stop pushed into an inoperative situation by the thumb acting against the push-pin and mediately against a finger of the same hand to support the bracket-arm against the thumb-pressure whereby one hand can be used to disengage the ring without disturbing the arm, substantially as described.

18. In combination a bracket, a spittoon-holder comprising a ring situated within the wall of the spittoon and bearing on its interior, said ring having an extension passing through said wall, a separate fastening passing through the wall to secure the ring and spittoon together, and means for detachably connecting the extension to the bracket or the like, said means being operative and the spittoon removable from the bracket with its mouth maintained in a horizontal plane, substantially as described.

19. In combination a bracket, a spittoon-holder comprising a ring situated within the wall of the spittoon, said spittoon having a mouth $a$ provided with an extension forming a skirt within the spittoon, said ring being covered by the skirt and situated between it and the wall of the spittoon and having an extension 95 passing through said wall, a separate fastening passing through the wall to secure the ring and spittoon together, and means for detachably connecting the extension to the bracket or the like, said means being operative and the spittoon removable from the bracket with its mouth maintained in a horizontal plane, substantially as described.

In testimony whereof I have signed this specification in the presence of two subscribing witnesses.

FRANK RITTER.

Witnesses:
CHARLES H. WILTSIE,
F. M. BOTTMER.